US012623645B2

(12) United States Patent
Buchert et al.

(10) Patent No.: US 12,623,645 B2
(45) Date of Patent: May 12, 2026

(54) METHODS AND SYSTEMS FOR IMPLEMENTING A REDUNDANT BRAKE SYSTEM

(71) Applicant: Waymo LLC, Mountain View, CA (US)

(72) Inventors: Timothy Alexander Buchert, Mountain View, CA (US); David James Smith, Mountain View, CA (US); Juan Manual Gomez-Ramos, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 150 days.

(21) Appl. No.: 18/539,643

(22) Filed: Dec. 14, 2023

(65) Prior Publication Data

US 2024/0208475 A1     Jun. 27, 2024

Related U.S. Application Data

(60) Provisional application No. 63/477,076, filed on Dec. 23, 2022.

(51) Int. Cl.
B60T 8/92          (2006.01)
B60T 7/12          (2006.01)
                    (Continued)

(52) U.S. Cl.
CPC ................. B60T 8/92 (2013.01); B60T 7/12 (2013.01); B60T 8/1708 (2013.01); B60T 8/323 (2013.01); B60T 8/885 (2013.01); B60T 13/683 (2013.01); B60T 17/22 (2013.01); B60T 2210/30 (2013.01); B60T 2250/04 (2013.01);
                    (Continued)

(58) Field of Classification Search
CPC .......... B60T 7/12; B60T 8/1708; B60T 8/323; B60T 8/88; B60T 8/885; B60T 8/92; B60T 13/68; B60T 13/683; B60T 17/22; B60T 2210/30; B60T 2210/32; B60T 2210/34; B60T 2250/04; B60T 2270/402;
                    (Continued)

(56) References Cited

U.S. PATENT DOCUMENTS

| | | | |
|---|---|---|---|
| 6,749,269 B1 * | 6/2004 | Niwa ..................... | B60T 13/741 303/20 |
| 10,351,110 B2 * | 7/2019 | Besier ..................... | B60T 7/042 |
| 2021/0179052 A1 * | 6/2021 | Grossman ................. | B60T 7/22 |

FOREIGN PATENT DOCUMENTS

KR          20230006666 A  *  1/2023   .......... B60W 60/001

OTHER PUBLICATIONS

Kim, KR 10-2023-0006666, machine translation. (Year: 2023).*

* cited by examiner

*Primary Examiner* — Mark L. Greene
(74) *Attorney, Agent, or Firm* — McDonnell Boehnen Hulbert & Berghoff LLP

(57)          ABSTRACT

Example embodiments relate to triple redundant brake systems for trucks and other types of vehicles. Disclosed systems offer additional redundancy for braking applications by incorporating a third service brake actuator (e.g., a third ECU), which may be installed parallel to the second controller (e.g., a second ECU). In some examples, the third service brake actuator is an electronically activatable pressure valve and can be implemented using pneumatic select-high valves. These valves can be used to perform a mechanical max arbitration between pressure provided by the second controller and the third controller.

19 Claims, 7 Drawing Sheets

(51) Int. Cl.

| | |
|---|---|
| *B60T 8/17* | (2006.01) |
| *B60T 8/32* | (2006.01) |
| *B60T 8/88* | (2006.01) |
| *B60T 13/68* | (2006.01) |
| *B60T 17/22* | (2006.01) |

(52) U.S. Cl.
CPC ... *B60T 2270/402* (2013.01); *B60T 2270/406* (2013.01); *B60T 2270/413* (2013.01); *B60T 2270/414* (2013.01)

(58) Field of Classification Search
CPC ......... B60T 2270/406; B60T 2270/413; B60T 2270/414
See application file for complete search history.

600

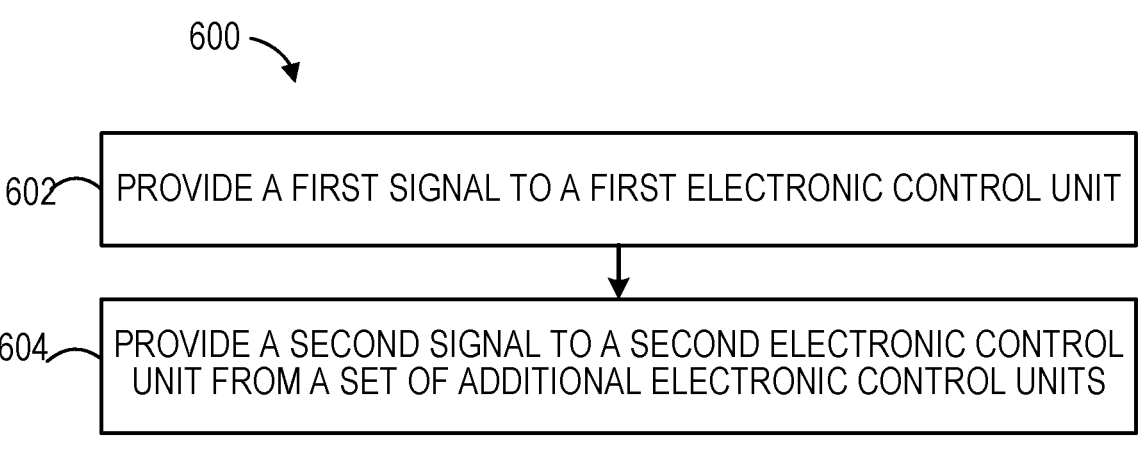

602   PROVIDE A FIRST SIGNAL TO A FIRST ELECTRONIC CONTROL UNIT

604   PROVIDE A SECOND SIGNAL TO A SECOND ELECTRONIC CONTROL UNIT FROM A SET OF ADDITIONAL ELECTRONIC CONTROL UNITS

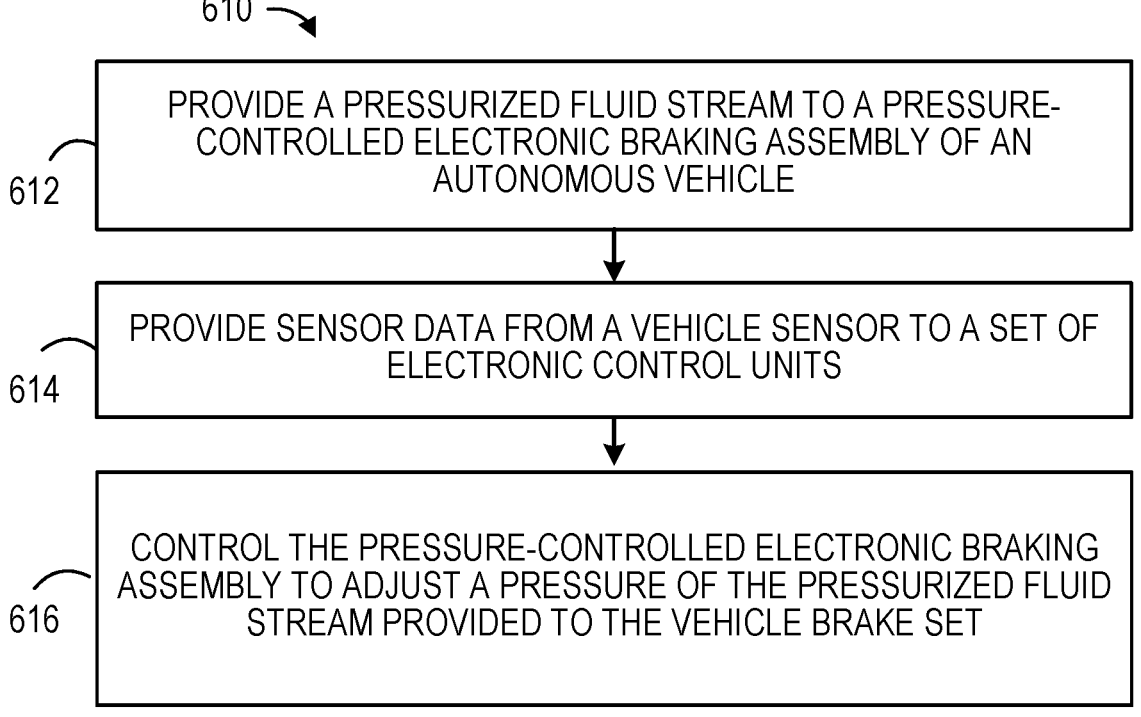

612   PROVIDE A PRESSURIZED FLUID STREAM TO A PRESSURE-CONTROLLED ELECTRONIC BRAKING ASSEMBLY OF AN AUTONOMOUS VEHICLE

614   PROVIDE SENSOR DATA FROM A VEHICLE SENSOR TO A SET OF ELECTRONIC CONTROL UNITS

616   CONTROL THE PRESSURE-CONTROLLED ELECTRONIC BRAKING ASSEMBLY TO ADJUST A PRESSURE OF THE PRESSURIZED FLUID STREAM PROVIDED TO THE VEHICLE BRAKE SET

Figure 6B

METHODS AND SYSTEMS FOR IMPLEMENTING A REDUNDANT BRAKE SYSTEM

CROSS REFERENCE TO RELATED APPLICATION

The present application claims priority to U.S. Provisional Patent Application No. 63/477,076, filed Dec. 23, 2022, the entire contents is hereby incorporated by reference.

BACKGROUND

Advancements in computing, sensors, and other technologies have enabled vehicles to safely navigate between locations autonomously, i.e., without requiring input from a human driver. By processing sensor measurements of the surrounding environment in near real-time, an autonomous vehicle can safely transport passengers or objects (e.g., cargo) between locations while avoiding obstacles, obeying traffic requirements, and performing other actions that are typically conducted by the driver. Shifting both decision-making and control of the vehicle over to vehicle systems can allow the vehicle's passengers to devote their attention to tasks other than driving.

SUMMARY

Example embodiments relate to triple redundant brake systems and techniques for using such brake systems on semi-truck tractors, trucks, and other types of vehicles. An example triple redundant brake system can leverage multiple secondary electronic control units (ECUs) that are communicably coupled in parallel to control one or more brake assemblies. The arrangement of multiple ECUs establishes multiple, redundant brake configurations, which are then available for use by a driver or vehicle systems to slow and stop the vehicle in a safe and efficient manner. In some cases, the example brake system enables the application of brakes in a situation where a multi-point failure occurred impacting both the primary and secondary braking subsystems on the vehicle. Vehicle systems can use disclosed brake systems to efficiently brake during autonomous or semi-autonomous navigation.

Accordingly, a first example embodiment describes a method. The method involves providing, by a computing system coupled to a vehicle, a first signal to a first electronic control unit (ECU). The first ECU is communicably coupled to a pressure-controlled electronic braking assembly. The method also involves providing, by the computing system, a second signal to at least a second ECU from a set of additional ECUs. The set of additional ECUs includes at least the second ECU and a third ECU communicably coupled in parallel to the pressure-controlled electronic braking assembly. The second ECU activates, based on the second signal, one or more vehicle brake sets of the vehicle via the pressure-controlled electronic braking assembly.

Another example embodiment describes a system. The system includes a vehicle having a vehicle brake system. The vehicle brake system includes a pressure-controlled electronic braking assembly coupled to one or more vehicle brake sets, and a plurality of electronic control units (ECUs) communicably coupled to the pressure-controlled electronic braking assembly. The system also includes a computing system coupled to the vehicle. The computing system is configured to: provide a first signal to a first ECU, and provide a second signal to at least a second ECU from the plurality of ECUs. The plurality of ECUs includes at least the second ECU and a third ECU communicably coupled in parallel to the pressure-controlled electronic braking assembly. The second ECU activates, based on the second signal, one or more vehicle brake sets of the vehicle via the pressure-controlled electronic braking assembly.

An additional example embodiment describes a method. The method involves providing, from a pressurized fluid source, a pressurized fluid stream to a pressure-controlled electronic braking assembly of an autonomous vehicle. The pressure-controlled electronic braking assembly is fluidly coupled to a vehicle brake set of the autonomous vehicle. The method also involves providing sensor data from a vehicle sensor of the autonomous vehicle to a set of electronic control units communicably coupled to the pressure-controlled electronic braking assembly. The set of electronic control units includes a primary electronic control unit and a pair of additional electronic control units, and the pair of additional electronic control units are communicably coupled in parallel to the pressure-controlled electronic braking assembly. The method also involves, based on the sensor data, controlling, by at least one of the electronic control units, the pressure-controlled electronic braking assembly to adjust a pressure of the pressurized fluid stream provided to the vehicle brake set.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6A is a flowchart of a method for actuating vehicle brakes, according to one or more example embodiments.

FIG. 6B is a flowchart of another method for actuating vehicle brakes, according to one or more example embodiments.

DETAILED DESCRIPTION

Figure 1:
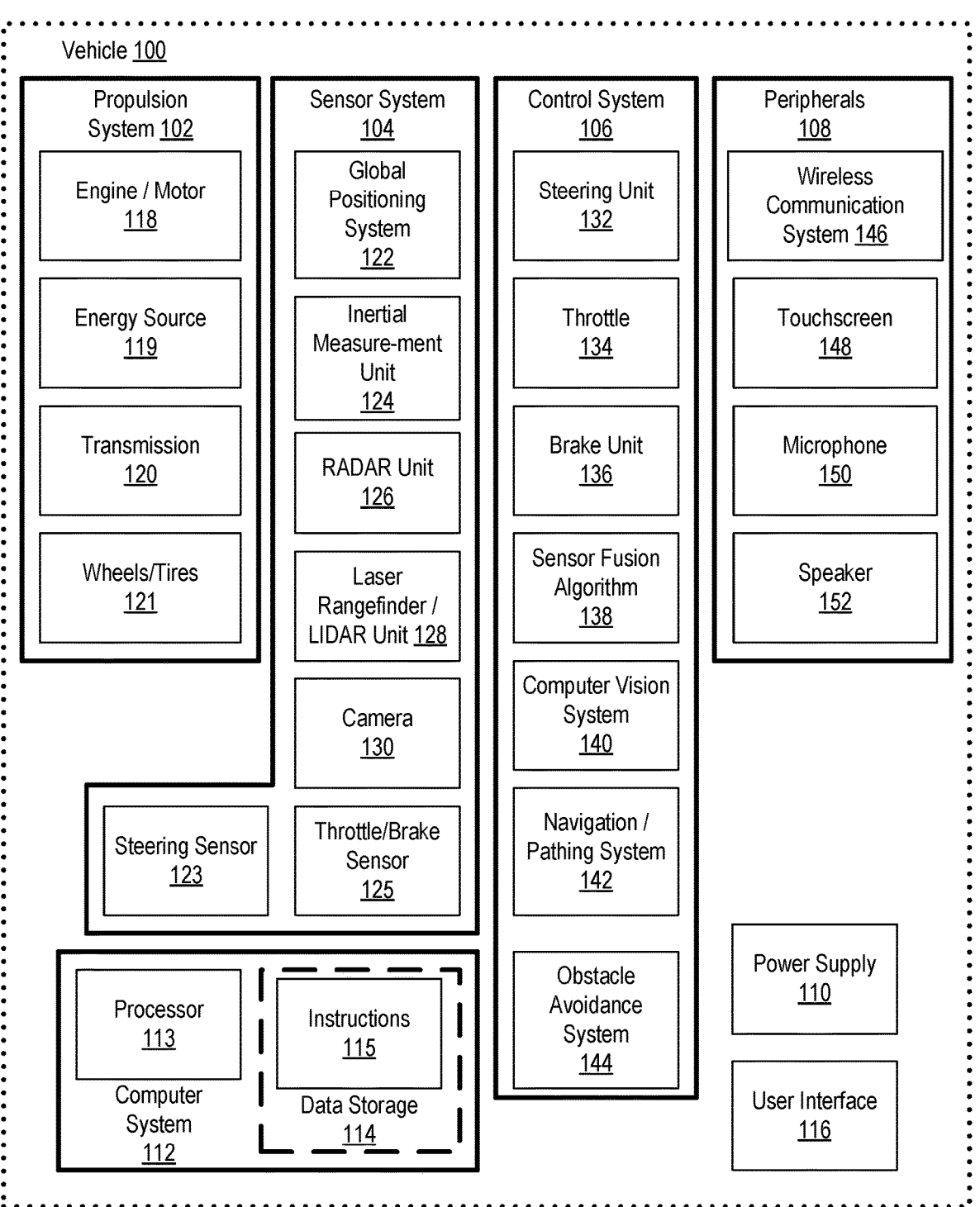
FIG. 1 is a functional block diagram illustrating a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure describes vehicle braking system configurations and methods for using these brakes on various types of vehicles, such as semi-trucks, construction vehicles, emergency vehicles, and passenger vehicles, etc. Because trucks and other large vehicles are often used to transport heavy loads (e.g., tens of thousands of pounds of weight), the performance of a truck's brake system is critical to ensure safe navigation.

Brake failure on a vehicle can arise due to various mechanical issues, environment factors, and other potential causes. For instance, some potential causes include brake fluid leaks or loss of hydraulic pressure due to worn-out brake lines or seals. In some cases, traditional braking systems can overheat during prolonged and heavy use, such as when a truck is descending a steep incline and requires substantial use of the brakes. This prolonged and heavy use of the brakes can lead to brake fade where the effectiveness of the brakes decreases due to excessive heat buildup. In some instances, water or debris can enter into brake components and cause brake issues that reduce the braking system's ability to function.

Example embodiments presented herein relate to triple redundant brake systems and techniques for using such brake systems on trucks and other types of vehicles to overcome the potential braking issues described above. In particular, disclosed vehicle braking systems and methods provide redundant braking assemblies that allow braking applications in cases of component or communication failure, which enables safe navigation in the dynamic environments encountered during transport.

Typically, larger vehicles such as semi-trucks, buses, and tractor trailers utilize air brakes that rely on compressed air. Air brake systems avoid potential hydraulic fluid leaks that may occur. Air brakes can be incorporated through drum brakes, disc brakes, or a combination of both. These brakes operate by utilizing air pressure generated by an engine-mounted compressor. This compressor pumps pressurized air into storage tanks, where the air is kept until needed to activate one or more brake sets on the vehicle. The air pressure is used during operation to engage the service brakes for regular navigation and to initiate other actions, such as releasing the parking brake.

Some brake system configurations incorporate multiple air circuits that utilize connections between braking components and air storage reservoirs. For example, the parking brake can activate through the spring force within the parking brake section of the spring brake-chamber when the air pressure in the chamber is released. This dual functionality enables the parking brake to serve as an emergency brake system. In the event of a significant drop in air pressure, the force produced by the spring within the chamber can surpass the air's force on the diaphragm, thus engaging the brakes on the wheel.

Example vehicle braking systems can include multiple pressure-controlled electronic braking assemblies operated by multiple ECUs. Each pressure-controlled electronic braking assembly can be fluidly coupled to one or multiple pressurized sources and to one or multiple vehicle brake sets of the vehicle. In some designs, a pressurized control output of a first pressure-controlled electronic braking assembly is directly connected to a pressurized control input of a second pressure-controlled electronic braking assembly. As such, each ECU can be communicably coupled to the first and second pressure-controlled electronic braking assemblies and one or more vehicle sensors. The ECUs can command one or both pressure-controlled electronic braking assemblies to adjust a pressure of one or multiple pressurized streams of the electronic braking assemblies.

Some example braking systems presented herein offer additional redundancy for braking applications by incorporating a third service brake actuator (e.g., a third ECU), which may be installed parallel to the second controller (e.g., a second ECU). For instance, the third service brake actuator can be an electronically activatable pressure valve implemented using pneumatic select-high valves. The valves can be used to perform a mechanical max arbitration between pressure provided by the second controller and the third controller.

Some example vehicle braking systems may further incorporate fail-safe designs that enable the braking system to apply the brakes in multi-point failure situations. For example, when multiple controllers of a vehicle braking system or communication between multiple components fail resulting in a multi-point failure, disclosed systems may enable automatic application of the brakes to slow down and stop the vehicle. As another example, when vehicle computing systems are unable to receive communication from braking controllers, the vehicle computing systems may have connections to components within the braking system that enables the lack of communication to result in the automatic application of brakes to slow down and stop the vehicle. As such, some examples describe braking designs that enable pneumatic brakes to be applied in the event that a complete power loss occurs.

In some examples, a brake design may implement a pneumatic strategy that acts as a "dead man's switch" where if the switch is "let go" (released), the braking system immediately applies the brakes of the vehicle. In particular, the dead man's switch implemented within example braking systems may require a multi-point failure to occur prior to applying vehicle brakes. For instance, a multi-point failure may impact both primary and secondary brake control subsystems in order to activate in some example configurations. By requiring multiple points of failure, disclosed brake systems may differ from other mitigation designs that exist for single point failure. The dead man's switch design may refrain from activation unless multiple points of failure are detected.

In various applications, the braking systems and methods for vehicles detailed here are utilized by autonomous or semi-autonomous vehicles across a spectrum of transportation, including cars, trucks, boats, robotics, and aircraft. The vehicles can employ a diverse array of onboard sensors and computer systems to detect nearby objects, utilizing this data to make informed decisions regarding control and navigation.

In addition, the vehicle systems rely on an assortment of machine learning models and other techniques to acquire, process, and effectively utilize sensor data obtained from the vehicle's sensors, ensuring safe navigation between different points. Moreover, these systems are capable of establishing communication with external sources, such as databases or remote operators. The sources may provide critical information, updates, or instructions that the vehicle systems can integrate into their autonomous or semi-autonomous navigation strategies. In specific scenarios, there might be instances where a driver is present within the vehicle and may provide control instructions, but the overall operations can be largely handled by the autonomous or semi-autonomous systems.

Referring now to the figures, FIG. 1 is a functional block diagram illustrating example vehicle 100, which may be configured to operate fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. In other examples, vehicle 100 may include more or fewer subsystems. The subsystems and components of vehicle 100 may be interconnected in various ways (e.g., wired or wireless connections). In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar unit 126, laser rangefinder/lidar unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects, including the speed and heading of the objects, within the local environment of vehicle 100. As such, radar unit 126 may include antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/lidar 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100. Brake unit 136 can be implemented as braking systems disclosed herein.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include processor 113 (which could include at least one microprocessor) operable to execute instructions 115 stored in a non-transitory computer readable medium, such as data storage 114. Processor 113 can include multiple processors and different types of processors. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
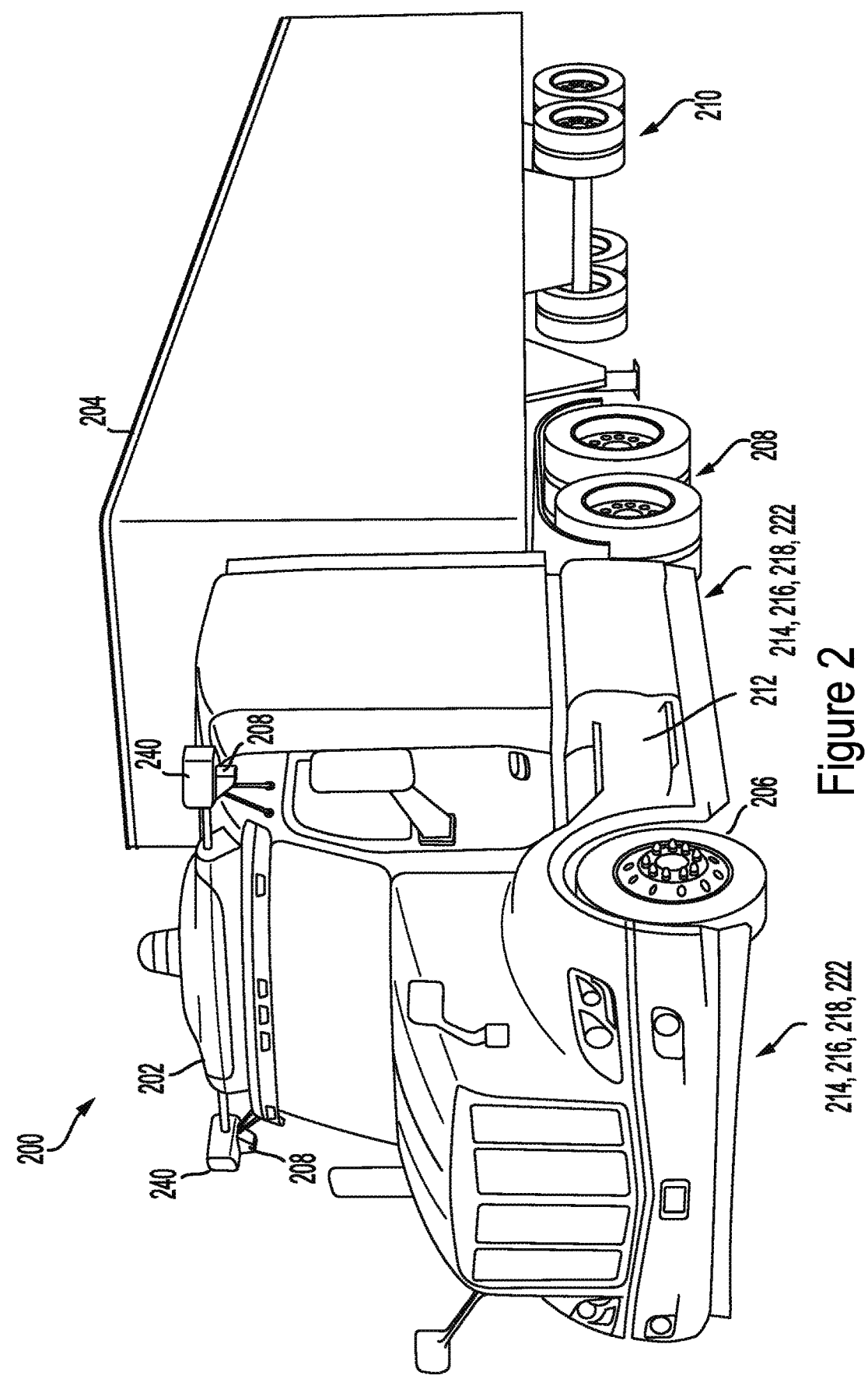
FIG. 2 illustrates a vehicle configuration, according to one or more example embodiments.

FIG. 2 displays a perspective of vehicle 200 equipped with vehicle braking system 212. In certain instances, elements of vehicle 100 depicted in FIG. 1 could assume the configuration of vehicle 200 as depicted in FIG. 2. While the illustrated vehicle 200 is presented as a Class 8 vehicle (for example, a tractor-trailer vehicle), the term "vehicle" in this context encompasses various vehicle types, including personal cars, both personal and commercial trucks, robotics, and other vehicles such as those used in nautical or aeronautical settings.

FIG. 2 illustrates a perspective view of vehicle 200 configured with vehicle braking system 212. In some examples, components of vehicle 100 represented in FIG. 1 may take the form of vehicle 200 shown in FIG. 2. Although the illustrated vehicle 200 is shown as a Class 8 vehicle (e.g., a tractor-trailer vehicle), the term "vehicle" in the present disclosure may also be used to represent other types of vehicle, such as a personal car, other personal or commercial trucks, robotics, and other vehicles (e.g., nautical or aeronautical vehicles).

As shown in FIG. 2, vehicle 200 includes tractor 202 and trailer 204, each of which form part of a vehicle frame of vehicle 200. Vehicle 200 further includes wheel set 206 (shown as front tractor wheels), wheel set 208 (shown as rear tractor wheels), and wheel set 210 (shown as trailer wheels). In addition, vehicle 200 also includes vehicle brake set 214, vehicle brake set 216, vehicle brake set 218, and vehicle brake set 222, which are shown associated with wheel sets 206-210. In other examples, the quantity and arrangement of vehicle brake sets 214-222 can differ.

Vehicle 200 can be a fully autonomous vehicle that determines and executes fully-autonomous driving decisions in order to navigate through an environment. For instance, vehicle 200 can include computing systems, sensors, and software that enables operation as a Level 2 through Level 5 automated vehicle according to the Society of Automotive Engineers (SAE)). In some cases, vehicle 200 can also be a semi-autonomous vehicle that uses sensor data and provides predictions to aid a human driver. For example, vehicle 200 can autonomously apply one or more vehicle brakes sets 214, 216, 218, and 222 if a prediction indicates that a human driver is about to collide with another vehicle or other types of objects in the environment. In other examples, vehicle 200 may have the capabilities to navigate portions of routes while enabling a driver to control vehicle 200 (or aspects of vehicle 200) during the remaining portions of the routes. Moreover, vehicle 200 can also have capabilities that enable vehicle 200 to participate autonomously within a convoy consisting of other vehicles. For instance, vehicle 200 can autonomously act as part of a convoy led by another vehicle controlled by a driver.

Vehicle 200 includes one or more sensors 240. In some examples, sensors 240 include a combination of components that receive reflections of electromagnetic radiation. For instance, sensors 240 may include one or more lidar systems, radar systems, and cameras, which can have various positions onboard tractor 202 and/or trailer 204. In some examples, other types of sensors can be used. For instance, sensors 240 can also include one or more wheel speed sensors, wind speed sensors, microphones, inertial measurement units (IMUs), pressure sensors, temperature sensors, GPS receivers, and/or other types of sensors.

As such, sensors 240 may generate and supply sensor data that can be used to determine the distance, direction, and/or intensity of reflections measured from objects and other surfaces in the environment. For example, a sensor can transmit one or more pulses of electromagnetic radiation in a particular direction and can measure the intensity of any reflections as well as the time that the reflection was received. The distance relative to the object can be computed by determining how long it took between a pulse and its corresponding reflection. The sensor can continually sweep a particular space in angle, azimuth, or both. Sweeping in azimuth, for example, can allow a sensor to detect multiple objects along the same line of sight. In addition, sensors 240 can also provide measurements representing operations of vehicle 200 and components of vehicle 200. For instance, a temperature sensor system can provide information that indicates a temperature of one or more components of the braking system on vehicle 200.

During operation, sensors 240 may provide sensor data that can be used by vehicle systems to determine a distance between vehicle 200 and another object (e.g., a vehicle driving nearby). For instance, sensors 240 can be used by vehicle systems to determine and monitor how close tractor 202 or trailer 204 is positioned relative to other objects in the environment, which can assist with safe navigation of vehicle 200.

Vehicle systems can communicate the data and/or other signals to vehicle braking system 212, which may use the data and/or the signals to actuate one or more vehicle brakes sets 214, 216, 218, 222. In some embodiments, vehicle brake sets 214-222 may include front axle brakes, trailer brakes, foundation brakes, and parking brakes. For instance, vehicle brakes 214-218 may act as conventional brakes, such as pressure-actuated (e.g., hydraulically, pneumatically, or otherwise) to move a brake pad against a disc brake to create friction to slow and possibly stop vehicle 200. The parking brake (e.g., vehicle brake 222) may be actuated to prevent unwanted movement of vehicle 200 from a stationary position or, in extreme instances, actuated to quickly bring a "runaway" vehicle 200 to a stop.

Vehicle braking system 212, generally and discussed in more detail herein, may provide for a redundant braking interface (e.g., with primary and fallback interfaces for control) that includes multiple pressure-controlled electronic brake assemblies connected in series and powered (electrically) from a low voltage vehicle bus (e.g., a 12 V bus). For instance, vehicle braking system 212 may include a triple redundant configuration that includes three or more controllers positioned to enable brake applications. Each of the pressure-controlled electronic brake assemblies may be a trailer electronic brake (TEB) module (or a trailer electronic braking system (TEBS)), such as a TEBS E module from WABCO. A TEB module, also referred to as a trailer brake controller or brake control module, is a device installed in a towing vehicle (e.g., tractor 202) to manage and control the electric brakes on a trailer (e.g., trailer 204).

Each TEB module can serve as an intermediary between the braking system of tractor 202 and the brakes on trailer 204 being towed. A TEB module (or multiple modules) may detect braking inputs, such as the pressure applied to the brake pedal or automatically triggered by a vehicle system, and subsequently send signals to the electrically-controlled brakes of trailer 204. The TEB modules can enable the driver or vehicle systems to regulate the braking force applied to trailer 204 independently of tractor 202. By synchronizing proportional braking action between tractor 202 and trailer 204, the TEB modules and other systems can enhance safety and stability during braking, including allowing for adjustments in braking intensity for greater control in different road and load conditions.

In some embodiments, vehicle braking system 212 may include redundant interfaces to permanently secure vehicle 200 in a parked state; a first interface may be through an electronic parking brake control over a vehicle communication network (e.g., a CAN bus network), while a second interface may be through a mechanical fail-on valve actuation when a supply pressure of a pressurized fluid drops below threshold value.

Figure 3:
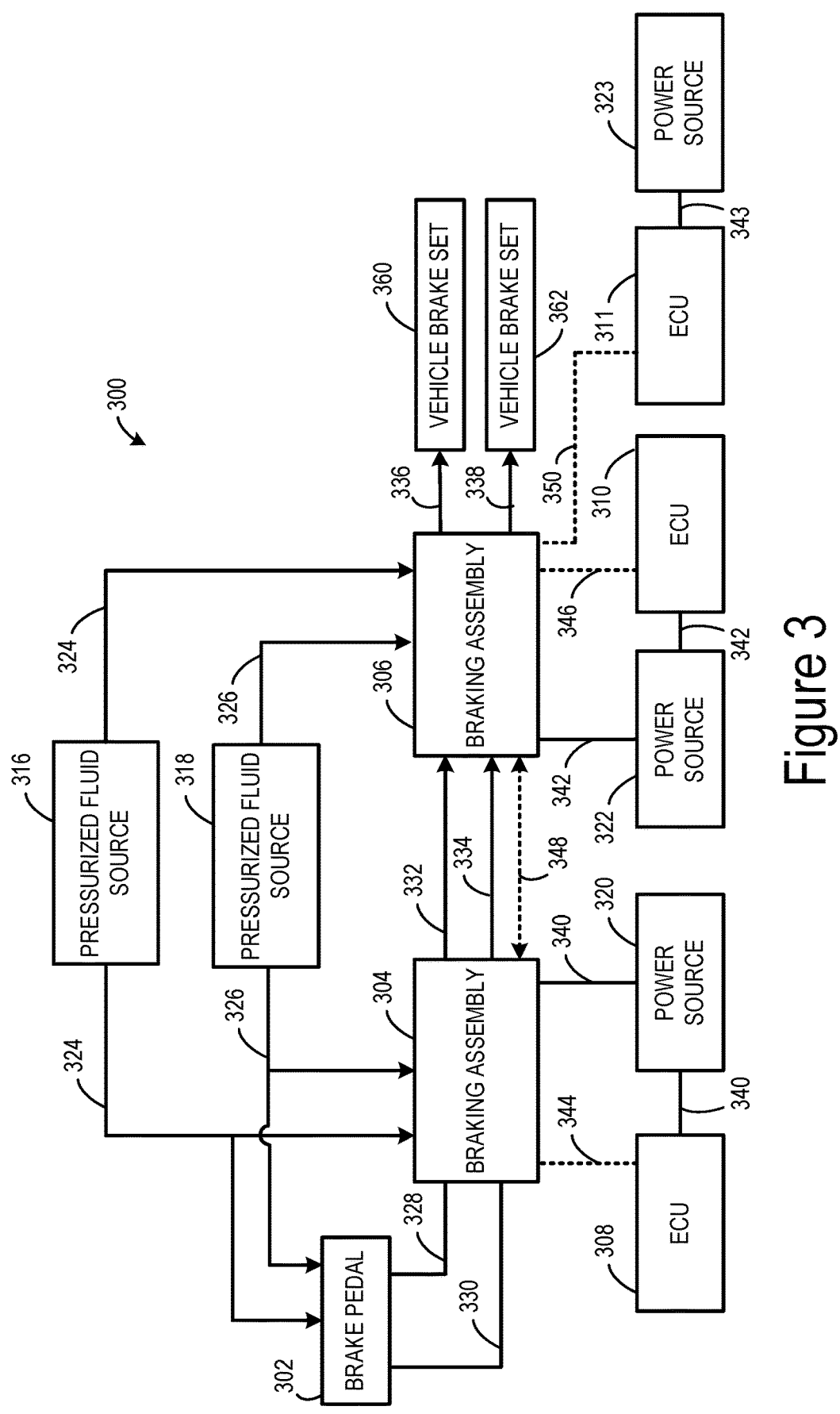
FIG. 3 is a block diagram of a vehicle braking system, according to one or more example embodiments.

FIG. 3 is a block diagram of vehicle braking system 300. In some embodiments, vehicle braking system 300 may be part of vehicle brake unit 136 of vehicle 100 shown in FIG. 1 and/or vehicle brake system 212 on vehicle 200 shown in FIG. 2. Vehicle braking system 300 is shown to represent an example of a redundant braking system. Other configurations are possible within examples.

Vehicle braking system 300 may actuate one or multiple vehicle brake sets on a vehicle. For instance, vehicle braking system 300 can include and use vehicle brake sets 214-222 described as part of the redundant braking system on vehicle 200 shown in FIG. 2. In some examples, the vehicle is an autonomous or semi-autonomous vehicle equipped with operator brake pedal 302. In addition, vehicle braking system 300 may operate in an autonomous or "active" mode (e.g., a normal operation for an autonomous vehicle) and a manual mode (e.g., in a non-autonomous mode).

Operator brake pedal 302 can enable a driver to control vehicle braking system 300 and may be located on the driver's side of the vehicle. For instance, operator brake pedal 302 may be used to engage the service or primary brakes of vehicle braking system 300. In some examples, vehicle systems may automatically control (e.g., depress and release) operator brake pedal 302. Depressing operator brake pedal 302 initiates a series of actions within vehicle braking system 300, which uses compressed air to actuate the brakes to apply pressure to brake drums or discs that slow down and/or stop the vehicle.

As shown in the example embodiment represented in FIG. 3, vehicle braking system 300 includes braking assembly 304 and braking assembly 306, which can be pressure-controlled electronic braking assemblies. A pressure-controlled electronic braking assembly can include electronic sensors and control units that monitor the pressure applied to operator brake pedal 302 and translate it into electronic signals, which can be processed and used by a control unit that regulates the brake actuation, potentially adjusting the pressure to the brakes in a more precise and responsive manner. In additional embodiments, vehicle braking system 300 may include additional braking assemblies.

One or both of braking assemblies 304, 306 may be connected to one or more pressurized-fluid sources and includes one or multiple pressure-control inputs and one or multiple pressurized control outputs. In some examples, braking assemblies 304, 306 operate with a pneumatic pressurized fluid, such as air or other gas. In other embodiments, braking assemblies 304, 306 operate with a hydraulic pressurized fluid, such as a liquid. As such, braking assemblies 304, 306 may operate to adjust a pressure of a pressurized fluid input to the particular pressure-controlled electronic braking assembly to provide a pressurized fluid output of the pressurized fluid at the adjusted pressure.

In the example embodiment, pressurized fluid source 316 and pressurized fluid source 318 are shown connected to braking assemblies 304-306 and may be used to supply pressurized fluid stream 324 and pressurized fluid 326 to braking assemblies 304, 306, respectively. In particular, both pressurized fluid streams 324, 326 can be supplied to operator brake pedal 302, braking assembly 304, and braking assembly 306, among other components not shown in FIG. 3.

Braking assembly 304 is shown connected between operator brake pedal 302 and braking assembly 306. Both pressurized fluid control outputs 332, 334 of braking assembly 304 are shown directly connected (e.g., plumbed) to braking assembly 306. As an example result, pressurized fluid control outputs 332, 334 output by braking assembly 304 then are also pressurized fluid control inputs 332 and 334 for braking assembly 306. For instance, pressure of pressurized fluid stream 332 output from braking assembly 304 can then be the same or negligibly different as the pressure of pressurized fluid stream 332 input to braking assembly 306. In some examples, braking assemblies 304, 306 may operate independently from the other.

Braking assembly 306 is shown with pressurized fluid control outputs 336, 338, which can provide pressurized fluid streams to actuate one or more vehicle brake sets of the vehicle (e.g., vehicle brake sets 360, 362). As an example, pressurized fluid control output 336 may be used to actuate a first vehicle brake set (or multiple sets), such as the front axle and trailer brake sets while pressurized fluid control output 338 may be used to actuate a second vehicle brake set (or multiple sets), such as the rear axle and trailer brake sets (e.g., for the illustrated vehicle 200 of FIG. 2).

In some cases, operator brake pedal 302 may be used and actuated by a vehicle operator (i.e., a driver) or a mechanical interface, which provides pressurized fluid control output 328 and pressurized fluid control output 330 to braking assembly 304 as shown in FIG. 3. As such, pressurized fluid control outputs 328-330 may depend on the actuation of operator brake pedal 302. The degree of actuation impacts the amount of pressure fluid is output through pressurized fluid control outputs 332, 334, which can then adjust the application of brakes by braking assembly 304 and braking assembly 306.

As further shown in FIG. 3, vehicle braking system 300 also includes electric power sources 320, 322, 323 that provide electrical power 340, 342, 343 (e.g., 12 volt power) to braking assemblies 304, 306, respectively. As shown, there are redundant sources of electrical power for the vehicle braking system 300, which can limit potential disruption should a particular source of power experiences interruption or failure.

The illustrated vehicle braking system 300 also includes ECU 308, ECU 310, and ECU 311. In general, each ECU can be responsible for monitoring, regulating, and coordinating various functions related to vehicle braking system 300. Each ECU can serve as a control hub for managing electronic aspects of vehicle braking system 300. In some examples, ECUs 308-311 can operate in sync to serve as a central control hub for vehicle braking system 300.

Each ECU 308-311 can be connected to one or multiple sensors that collect data about different parameters related to vehicle braking system 300, such as wheel speed, brake pad wear, hydraulic pressure, and more. ECUs 308-311 can process this information and make real-time decisions to ensure optimal brake performance. In addition, ECUs 308-311 can communicate with other vehicle systems, such as the central control system that controls the vehicle during autonomous or semi-autonomous navigation.

As shown in FIG. 3, ECUs 308-311 are powered by electrical power 340, 342, and 343, respectively, that are output from electric power sources 320, 322, and 323. ECU 308 is illustrated as communicably connected to braking assembly 304 through network connection 344 (e.g., on a CAN bus network). In addition, ECU 308 is also communicably connected to braking assembly 306 through braking assembly 304 and network connection 348. As also shown in FIG. 3, ECU 310 is communicably connected to braking assembly 306 through network connection 346 (e.g., on a CAN bus network). ECU 310 is also communicably connected to the pressure-controlled electronic braking assembly 304 through braking assembly 306 and network connection 348.

In general, a CAN bus network is a communication system that can be used to facilitate communication between various ECUs (e.g., ECUs 308-311) and devices within the vehicle. The CAN bus network enables different components and systems to share information and data efficiently. As such, ECUs 308-311 are able to use a CAN bus network or other technologies to communicate with each other, sensors, and actuators in real-time. In some examples, a CAN bus can use a two-wire communication protocol that transmits and receives data between different modules. For instance, information can be exchanged, such as speed, engine, parameters, braking status, and transmission control.

As further shown, ECU 311 is also shown as part of vehicle braking system 300. In particular, ECU 311 is communicably connected to braking assembly 306 through network connection 350 (e.g. on a CAN bus network). ECU 311 is also communicably connected to braking assembly 304 through braking assembly 306 and network connection 348. ECU 311 is shown positioned in parallel relative to ECU 310 and can perform similar options in situations when ECU 310 may be inoperable. The combination of ECUs 308-311 can control vehicle brake sets 360, 362 in various ways. For instance, ECU 308 and ECU 311 may control vehicle brake sets 360, 362 in some situations.

Each ECU may include a microprocessor-based controller that performs operations, such as receiving data from the vehicle (such as sensor data from one or more sensors 240 and/or control instructions from a vehicle computing system) and controlling operation of braking assemblies 304 and 306 to control or adjust a pressure of one or more pressurized fluid streams (e.g., 336 and 338) provided to actuate one or more vehicle brake sets (e.g., vehicle brake sets 360-362). In addition, each ECU 308, 310, 311 can be communicably coupled to one or more additional ECUs in some examples. For instance, the additional ECUs may control other components of the vehicle besides the one or more vehicle brake sets.

In some instances, vehicle braking system 300 may operate in active mode, in which a combination of ECU 308, ECU 310, ECU 311 control operations of braking assemblies 304-306. Controls may be based on vehicle sensor data received from sensors 240 and/or instructions from a vehicle computing system positioned on board the vehicle. For example, if the vehicle sensor data does not indicate a need for braking or stopping the vehicle, a combination of ECUs 308, ECU 310, and ECU 311 may not operate to control braking assemblies 304, 306 to adjust a pressure of the pressurized fluid control outputs 336, 338 to actuate the one or more vehicle brake sets. If the vehicle sensor data does indicate a need for braking or stopping the vehicle, a combination of ECU 308, ECU 310, and ECU 311 may operate to control braking assemblies 304, 306 to adjust the pressure of pressurized fluid control outputs 336, 338 to actuate the one or more vehicle brake sets.

When the vehicle is an autonomous vehicle, vehicle braking system 300 may also enable operation in a manual mode. In manual mode, operator brake pedal 302 may be adjusted by a driver to adjust the pressure of pressurized fluid control outputs 328, 330. As the adjustment raises the pressure of the pressurized fluid greater than that of control outputs 332, 334, pressurized fluid control outputs 328, 330 may pass through braking assemblies 304, 306 without further adjustment to control outputs 336, 338 (and to one or more vehicle brake sets 360, 362). Thus, in some aspects, even when vehicle braking system 300 is operating in active mode, braking assemblies 304, 306 may not prevent operator brake pedal 302 from being actuated to build brake pressure due to a mechanical "highest pressure wins" valve inside braking assemblies 304, 306.

During operation, braking assemblies 304-306 may monitor control pressure fluid control outputs 328-330 generated based on pressure applied to operator brake pedal 302 and control output pressures 332, 334 from braking assembly 304, and outputs 336, 338 from braking assembly 304, and report these over network communications 344, 346, and 348. Such signals are used to detect normal operating conditions, driver brake actuations, as well as fault conditions. For example, as for fault modes, in some aspects, no single network communication fault (e.g., CAN bus fault) can interrupt all communications between ECUs 308, 310, 311 and braking assemblies 304, 306. Also, no single hardware/pressurized-fluid fault may prevent ECUs 308, 310, 311 from operating to build brake pressure in one or both braking assemblies 304, 306 through the network communication interfaces 344, 346, 348, and 350.

During operation, braking assemblies 304 and 306 may not interfere with and are unaffected by other ECUs operating on the network communications (e.g., other CAN bus nodes). Further, braking assemblies 304-306 may appear as similar nodes to an anti-lock braking (ABS) system of a vehicle as does operator brake pedal 302, thereby allowing brake control of the one or more vehicle brake sets from braking assemblies 304-306 to pass through standard ABS and vehicle electronic stability control (ESC) functional blocks of braking assemblies 304-306 as conventionally designed in these component.

Figure 4:
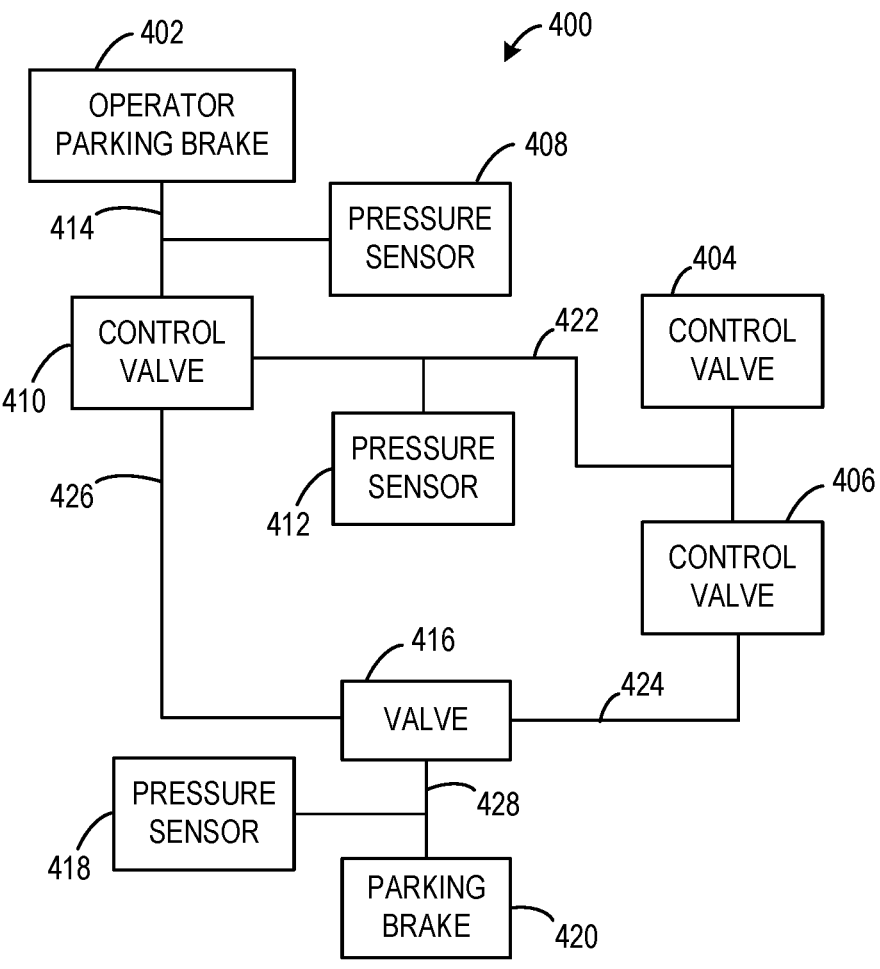
FIG. 4 is a block diagram of a braking sub-system, according to one or more example embodiments.

FIG. 4 is a block diagram of braking subsystem 400. In some embodiments, braking subsystem 400 is part of the vehicle braking system 212 shown in FIG. 2 and also includes some components of vehicle braking system 300 shown in FIG. 3. As such, vehicle braking sub-system 400 may operate to actuate a parking brake in a vehicle. In some examples, vehicle braking subsystem 400 may operate in an autonomous or "active" mode (e.g., a normal operation for an autonomous vehicle) and a manual mode (e.g., in a non-autonomous vehicle or in an autonomous vehicle that includes an operator parking brake).

As shown, vehicle braking subsystem 400 includes operator parking brake 402, which can be connected to pressurized fluid sources (e.g., pressurized fluid sources 316, 318 shown in FIG. 3) to receive pressurized fluid streams (e.g., pressurized fluid streams 324, 326 from vehicle braking system 300). A pressurized fluid control output 414 from parking brake 402 connects to control valve 410. Pressure sensor 408 is positioned to measure the pressure value of pressurized fluid in control output 414. Control valve 410 can be communicably coupled to one or more ECUs (e.g., ECU 308 through network communication 344). In general, communicably coupled enables multiple components to share signals, pressurized fluid, or other data with each other. Similarly, control valve 404 can be communicably coupled to ECU 310 on network communication interface 346 and/or ECU 311 on network communication interface 350.

As such, control valve 410 (and other control valves) can be in an "ON" state when the pathway through the valve is powered or an "OFF" state when the pathway through the valve is not powered or when the valve is in a failed state. Control valve 410 can also be fluidly coupled to pressurized fluid sources 316, 318 to receive pressurized fluid streams 324, 326, respectively. A pressurized fluid control output 422 is connected from control valve 404 to control valve 406 as well as control valve 410. In the example implementation, pressure sensor 412 is in communication to measure the pressurized fluid in control output 422 upstream of control valve 410.

Control valve 406 can be communicably coupled to ECU 308 on network communication interface 344 and positioned to receive the pressurized fluid from control output 422 from control valve 404 (as an input) and provide pressurized fluid control output 424 to binary valve 416 (e.g., an "or" valve that allows a high pressurized fluid to pass through). Control valve 410 also provides a pressurized fluid control output 426 to binary valve 416. A pressurized fluid control output 428 is connected from binary valve 416 to parking brake 420 (e.g., tractor parking brake, trailer parking brake, or both). Pressure sensor 418 is in communication with output 428 to measure the pressurized fluid from control output 428 downstream of binary valve 416.

Vehicle braking subsystem 400 can enable a conventional pressure actuated (e.g., pneumatic or hydraulic) parking brake to be implemented in an autonomous vehicle braking system (e.g., vehicle braking system 212) without interfering with operator control of parking brake 420. For example, when the vehicle braking subsystem 400 is operating in a manual mode (e.g., even in an autonomous vehicle). During a manual mode, e.g., when ECUs 308-311 are not commanding the control valves 406, 404, and 410, and they are in their default state, operator parking brake 402 operates conventionally to apply parking brake 420 (e.g., to keep the vehicle at a stationary position). In some aspects, the operation of parking brake 420 by the operator parking brake 402 in a manual mode is not changed relative to conventional operation, e.g., for a Class 8 truck in this industry. Further, in some aspects, the fault modes of the vehicle braking subsystem 400 are unchanged relative to conventional Class 8 parking brake system layouts in the manual mode, e.g., portion of parking brake 420 that includes parking brake 402.

As shown, FIG. 4 shows a single circuit (e.g., single vehicle braking subsystem 400) that describes an example implementation of the sub-system 400 for, e.g., a tractor of a Class 8 vehicle. In some aspects, the example implementation of the sub-system 400 may be duplicated for, e.g., a trailer of the Class 8 vehicle (i.e., a parking brake system for the system). For instance, control valves, such as control valves 404, 406, 410, and 416 would be duplicated. Further, for instance, parking brake 402 may include a standard square yellow push-pull knob for trailer parking brake actuation. A vehicle may include two vehicle braking subsystems 400, where a first vehicle braking subsystem 400 controls a tractor parking brake and a second vehicle braking subsystem 400 controls a trailer parking brake.

In an active mode (e.g., autonomous vehicle control by the ECUs), parking brake 402 may be set to "apply parking brake" such that in the event of a dual failure of power (e.g., electrical or pressurized fluid) or network communication, parking brake 420 is applied (e.g., automatically and mechanically). As shown in vehicle braking subsystem 400, the layout of the control valves 404, 406 and 410 (and binary valve 416) provides that even if any single control valve (404, 406, 410) becomes stuck or faults to the wrong location, the vehicle braking subsystem 400 still has full control over the parking brake (e.g., can still apply and release the vehicle parking brake 400).

Control valves 404, 406 can have default positions that fluidly decouple the pressurized fluid streams 424, 426 from binary valve 416, while control valve 410 has a default position that fluidly couples the pressurized fluid streams 324 and 326 with binary OR valve 416. During autonomous operation control, however, should one or multiple of the ECUs determine that the vehicle parking brake 420 should be applied (e.g., in the case of a runaway vehicle situation) even when operator parking brake 402 is not applied, one or both of the ECUs 308 or 310 may set control valves 404, 406 to their default positions, thereby exhausting pressure in pressurized fluid output 424 to actuate vehicle parking brake 420 through binary valve 416. Control valve 410 can also be set to either default or non-default position by an ECU in such a manner as to actuate vehicle parking brake 420 (exhausting air pressure in pressurized fluid output 426) through either output 414 of operator parking brake 402 or through pressurized fluid output 422.

As the pressurized fluid control output 424 may be greater than the pressurized fluid output 426, the binary OR valve 416 passes the pressurized fluid control output 324 to actuate the vehicle parking brake 420. In the case where any single control valve shown in FIG. 4 is in an incorrect position, the cross-circuit control valves combined with the binary OR valve 416 provides full control authority via either the operator circuit (e.g., the pressurized fluid circuit that includes the operator parking brake 402) or the autonomous circuit (e.g., the pressurized fluid circuit that includes control valves 404 and 406 controlled by the ECUs).

During operation of the vehicle braking subsystem 400, in some aspects, a single network communication interface (e.g., CAN bus) fault or digital I/O fault may not accidentally apply or release the vehicle parking brake 420. Further, in some aspects, no single hardware/pressurized fluid fault can cause faulty application of the vehicle parking brake 420 or prevent one or multiple of the ECUs from applying or releasing the vehicle parking brake 420. In some aspects, in the event of a dual network communication or power (e.g. electric or pressurized fluid) fault, the vehicle braking subsystem 400 may apply the vehicle parking brake automatically as a failsafe fault mode (e.g., to prevent a runaway autonomous vehicle).

Figure 5:
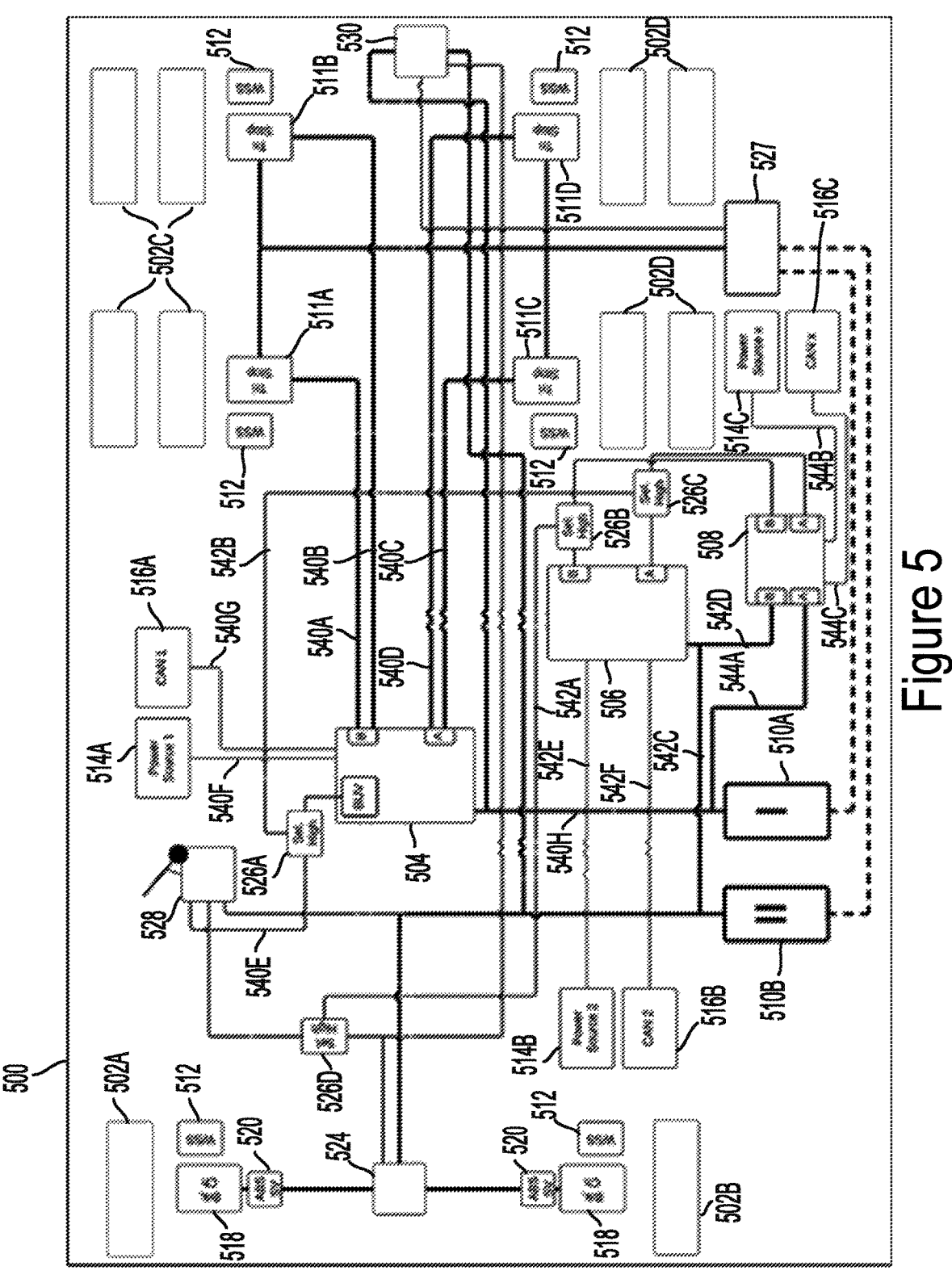
FIG. 5 illustrates a vehicle braking system, according to one or more example embodiments.

FIG. 5 illustrates brake system 500, which can be implemented onboard a class 8 vehicle or other types of vehicles within example embodiments. In the example embodiment, brake system 500 is shown as a triple redundant brake system showing components arranged in a particular arrangement. In other examples, brake system 500 may include more or fewer components in other potential arrangements.

Brake system 500 includes components arranged to create multiple brake circuits that can slow and stop the wheels of a vehicle. In particular, brake system 500 can be used to apply brakes at front right wheel 502A, front left wheel 502B, and rear right wheels 502C and rear wheels 502D. In other examples, the vehicle that uses brake system 500 can have a different quantity of wheels and axles.

As further shown in FIG. 5, brake system 500 includes multiple brake controllers: primary brake controller 504, secondary brake controller 506, and tertiary brake controller 508. With the different brake circuits enabled by including multiple brake controllers, brake system 500 enables multiple options for slowing and stopping the rotation of these wheels 502A-502D, which increases safety in situations of brake malfunction or error. As an example, in some cases, primary brake controller 504 and second brake controller 506 perform operations to work together so that any single point failure within brake system 500 does not lead to a loss of braking for the vehicle. In some example embodiments, both primary brake controller 504 and secondary brake controller 506 are connected to independent communication and power sources such that a failure in these, which may be outside the brake system boundary, also does not lead to a loss of braking for the vehicle. In the event of a primary system failure involving primary brake controller 504, secondary brake controller 506 has two outputs that can control the drive axles and the steer axle/trailer output respectively. These outputs of secondary brake controller 506 allow for pneumatic control of axle pressures.

In the example embodiment shown in FIG. 5, brake system 500 further includes tertiary brake controller 508, which is shown installed in parallel to secondary brake controller 506. With this architecture, tertiary brake controller 508 can use the same pneumatic paths that secondary brake controller 506 would use. As such, tertiary brake controller 508 can operate as a redundant brake controller relative to one or both primary brake controller 504 and secondary brake controller 506. In some embodiments, brake system 500 may not include secondary brake controller 506 and rely on tertiary brake controller 508 to provide redundancy relative to primary brake controller 504.

One or multiple of the brake controllers involve electronically actuatable pressure valves in some examples. In addition, brake controllers may communicate with one-another and manage the arbitration for braking applications. As shown in FIG. 5, the brake controllers are connected to different components within brake system 500, which includes reservoir 510A, reservoir 510B, brake actuators 511, wheel-speed sensors 512, power source 514A, power source 514B, power source 514C, controller area network (CAN) 516A, CAN 516B, CAN 516C, brake chambers 518, anti-lock braking systems 520, modulate-able valve 524, valve 526A, valve 526B, valve 526C, valve 526D, parking brake controller 527, foot brake module (FBM) 528, trailer control module (TCM) 530.

Primary brake controller 504 represents a main controller that can be used to apply brakes to slow down and stop rotation of wheels 502A-502D. Within brake system 500, primary brake controller 504 is shown connected to FBM 528 via connection 540E that includes valve 526A. In some implementations, valve 526A and one or more other valves 526B-526D can be set high valves, which can be used to select the maximum pressure from the provided input pressures. In addition, primary brake controller 504 includes a first output that is connected to both rear brake 511A and rear brake 511B via connection 540A and connection 540B, respectively. Similarly, a second output of primary brake controller 504 is connected to rear brake 511C and rear brake 511D via connection 540C and connection 540D, respectively. As further shown in brake system 500, primary brake controller 504 is also connected to power source 514A via connection 540F, to CAN 516A via connection 540G, and to reservoir 510A via connection 540H. As such, primary brake controller 504 serves as one controller capable of applying the brakes.

Secondary brake controller 506 serves as a redundant controller that can be used to apply brakes to slow down and stop rotation of wheels 502A-502D. Within brake system 500, secondary brake controller 506 has a first output that is connected to footbrake module 528 via connection 542A that includes valve 526B and valve 526D. Secondary brake controller 506 also has a second output that is connected to footbrake module 528 via connection 542B through valve 526A and valve 526C. Secondary brake controller 506 is also shown connected to reservoir 510B via connection 542C and to controller 508 via connection 542D. As further shown, brake controller 506 can receive power from power source 514B via connection 542E and communicate with CAN 516B via connection 542F.

In some examples, primary brake controller 504 and secondary brake controller 506 may communicate with each other via a private bus between the two (not shown), which enables communication if one or both CAN 516A or CAN 516B fail. In some cases, however, the private bus may not work as a gateway so a failure of CAN 516A may cause a fail-over to secondary brake controller 506. A vehicle computing system may send identical requests on both CAN 516A and CAN 516B to enable brake system 500 to determine whether primary brake controller 504 or secondary brake controller 506 fulfills the command. In addition, primary brake controller 504 and secondary brake controller 506 may continuously report their health status to the vehicle computing system so that the vehicle computing system is aware if an issue occurs in either system and can take appropriate action.

Tertiary brake controller 508 serves as another brake controller that can be used to apply brakes to slow down and stop rotation of wheels 502A-502D. As shown, tertiary brake controller 508 is coupled to brake controller 506 via connection 542D and connected to reservoir 510A via connection 544A and to reservoir 510B via connection 542D, which can be shared with brake controller 506. In other examples, the pneumatic plumbing can be separated to allow fail-safe valve operations by the compression and air dryer system. Tertiary brake controller 508 is powered via connection 544B to power source 514C and also connected to CAN 516C via connection 544C. As such, tertiary brake controller 508 may be connected to the same low voltage and communication networks as secondary brake controller 506 in some examples. In such a configuration, tertiary brake controller 508 can operate in a redundant configuration with primary brake controller 504 using a different low voltage supply and a different communication network.

In some embodiments, a vehicle computing system may also act as the arbitrator between primary brake controller 504 and tertiary brake controller 508. The vehicle computing system may determine the ability of primary brake controller 504 to fulfill brake commands. In the event that primary brake controller 504 reports a degraded health status or the vehicle computing system detects a lack of response from primary brake controller 504, the vehicle computing system can send commands to tertiary brake controller 508 in order to brake the vehicle. In such cases, primary brake controller 504 can be configured to open the back-up valves located in modulate-able valve 524, at primary brake controller 504, and/or at TCM 530. In some instances, power can be removed from primary brake controller 504 to ensure valves are open. As an example result, tertiary brake controller 508 can enable brake applications in the event of a failure of primary brake controller 504.

Reservoirs 510A, 510B are pressure-rated tanks that can hold a supply of compressed air until required for braking or operating auxiliary air systems. As such, reservoirs 510A-510B may be designed to store a sufficient volume of air to allow several brake applications if the engine stops or the compressor fails and the maximum air pressure available for brake applications depends on how much air is in reservoir 510A-510B. The vehicle may not be able to make a higher pressure brake application than there is air pressure in reservoirs 510A-510B. Each reservoir is equipped with a drain valve, which can allow reservoirs 510A-510B to be drained of moisture and other contaminants that build up in the system. In addition, reservoirs 510A, 510B can be connected to a compressed-air supply device, which can supply each reservoir 510A, 510B with compressed air.

As shown in FIG. 5, reservoirs 510A, 510B can be connected to parking brake controller 527, which enables distribution of compressed air to rear brakes 511A-511D for parking applications. If a severe enough pneumatic leakage occurs, the parking brakes are configured to automatically apply in some embodiments. Wheel-speed sensors 512 represent sensors that can measure the rotation of wheels 502A-502D. Wheel-speed sensors 512 can measure the speed of associated wheels in order to detect whether a given wheel is locked or tending to lock.

Power sources 514A-514C represent any type of onboard power supply source that can provide power to controllers and other components displayed as part of brake system 500. Brake chambers 518 can convert compressed air pressure energy into mechanical force and movement that apply the vehicle's brakes. Air pressure enters the pressure side of the brake chamber through the inlet port and forces against the diaphragm, which moves the pushrod assembly forward. When air pressure is released from brake chambers 518, the return spring returns the diaphragm and push rod to their released positions.

Anti-lock brake system 520 can be used to help the vehicle to steer by preventing the wheels from locking up. As shown, anti-lock brake systems 520 are coupled to modulate-able valve 524. Valves 526A-526D can enable different brake controllers to control the pressure of individual axles of the vehicle. FBM 528 represents a brake module and is shown connected to the primary brake controller via connection 540E that includes valve 526A. TCM 530 represents any type of trailer control module, which can be used to coordinate control of the trailer. For instance, TCM 530 can be used to apply a specific amount of pressure to the trailer brakes (not shown).

In some embodiments, a primary control circuit can be formed using primary brake controller 504, reservoir 510A, and tertiary brake controller 508. As shown, reservoir 510A can be coupled to tertiary brake controller 508 via connection 544A and also connected to primary brake controller 504 via connection 540H. The side of tertiary brake controller 508 commands the pressure to the drive axles via the pilot line, which mechanically or pneumatically controls the valves within primary brake controller 504 that drive air volume to rear brakes 511A-511D via connections 540A-540D, respectively.

A secondary circuit control is formed as shown in FIG. 5. In particular, the secondary control circuit can be formed using reservoir 510B, modulate-able valve 524, and tertiary brake controller 508. Secondary reservoir 510B is plumbed to a source of tertiary brake controller 508, which can command pressure to the steer axle via pilot line which mechanically (pneumatically) controls the valve within modulate-able valve 524 that drives air volume to brake chambers 518, which can be positioned by steer axle. Similarly, tertiary brake controller 508 can command pressure to the TCM via pilot line which mechanically or pneumatically drives air volume to the trailer axle brake chambers (not shown).

FIG. 6A and FIG. 6B are methods for using a triple redundant brake system. Method 600 shown in FIG. 6A and method 610 shown in FIG. 6B represent example methods that may include one or more operations, functions, or actions, as depicted by one or more of blocks 602 and 604 and blocks 612, 614, and 616, respectively. Each block may be carried out by any of the systems, devices, and/or vehicles shown in FIGS. 1-5 and FIG. 7, among other possible systems.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as may be understood by those reasonably skilled in the art.

At block 602, method 600 involves providing, by a computing system coupled to a vehicle, a first signal to a first electronic control unit (ECU). The first ECU is communicably coupled to a pressure-controlled electronic braking assembly. In some examples, the vehicle is a class 8 truck.

In some examples, the computing system may receive sensor data from a sensor coupled to the vehicle. The sensor data represents the environment of the vehicle. The computing system may then provide, based on the sensor data, the first signal to the first ECU.

At block 604, method 600 involves providing, by the computing system, a second signal to at least a second ECU from a set of additional ECUs. The set of additional ECUs includes at least the second ECU and a third ECU communicably coupled in parallel to the pressure-controlled electronic braking assembly. The second ECU activates, based on the second signal, one or more vehicle brake sets of the vehicle via the pressure-controlled electronic braking assembly.

In some examples, the first ECU is coupled to a first power source, and the second ECU and the third ECU are coupled to a second power source. In other examples, the first ECU is coupled to a first power source, the second ECU is coupled to a second power source, and the third ECU is coupled to a third power source.

In some examples, the computing system may determine a speed of the vehicle remains unchanged for a threshold duration after providing the first signal to the first ECU, and provide the second signal to the second ECU based on determining the speed of the vehicle remains unchanged for the threshold duration.

In some examples, the computing system may receive a response from the first ECU. The response may indicate the first ECU is unable to operate the pressure-controlled electronic braking assembly. The computing system may provide, based on receiving the response from the first ECU, the second signal to the second ECU.

In some examples, the computing system may provide the second signal to the second ECU and provide a third signal to the third ECU. The third ECU activates one or more vehicle brake sets of the vehicle based on the third signal. The computing system may provide the third signal to the third ECU in parallel with providing the second signal to the second ECU. In some examples, the computing system may determine a speed of the vehicle remains unchanged for a threshold duration after providing the second signal to the second ECU and, based on determining the speed of the vehicle remains unchanged for the threshold duration, provide the third signal to the third ECU.

In some examples, the computing system may provide, based on providing the second signal to at least the second ECU from the set of additional ECU, an alert at a control interface of the vehicle. The alert may include at least an audio alert or visual alert indicating a malfunction associated with the first ECU.

In some examples, the computing system may determine that the speed of the vehicle remains unchanged for a threshold duration after providing the second signal to at least the second ECU. Based on determining the speed of the vehicle remains unchanged for the threshold duration, the computing system may depower a pair of solenoid valves, which triggers an application of at least one brake set of the vehicle.

Method 610 shown in FIG. 6B can be performed by disclosed systems. As shown in FIG. 6B, block 612 of method 610 involves providing, from a pressurized fluid source, a pressurized fluid stream to a pressure-controlled electronic braking assembly of an autonomous vehicle. The pressure-controlled electronic braking assembly is fluidly coupled to at least one vehicle brake set of the autonomous vehicle.

At block 614, method 610 involves providing sensor data from one or more vehicle sensors of the autonomous vehicle to a set of ECUs communicably coupled to the pressure-controlled electronic braking assembly. The set of ECUs includes a primary electronic control unit and a pair of additional ECUs. The pair of additional ECUs are communicably coupled in parallel to the pressure-controlled electronic braking assembly.

At block 616, method 610 involves, based on the sensor data, controlling, by at least one of the ECUs, the pressure-controlled electronic braking assembly to adjust a pressure of the pressurized fluid stream provided to the vehicle brake set.

Figure 7:
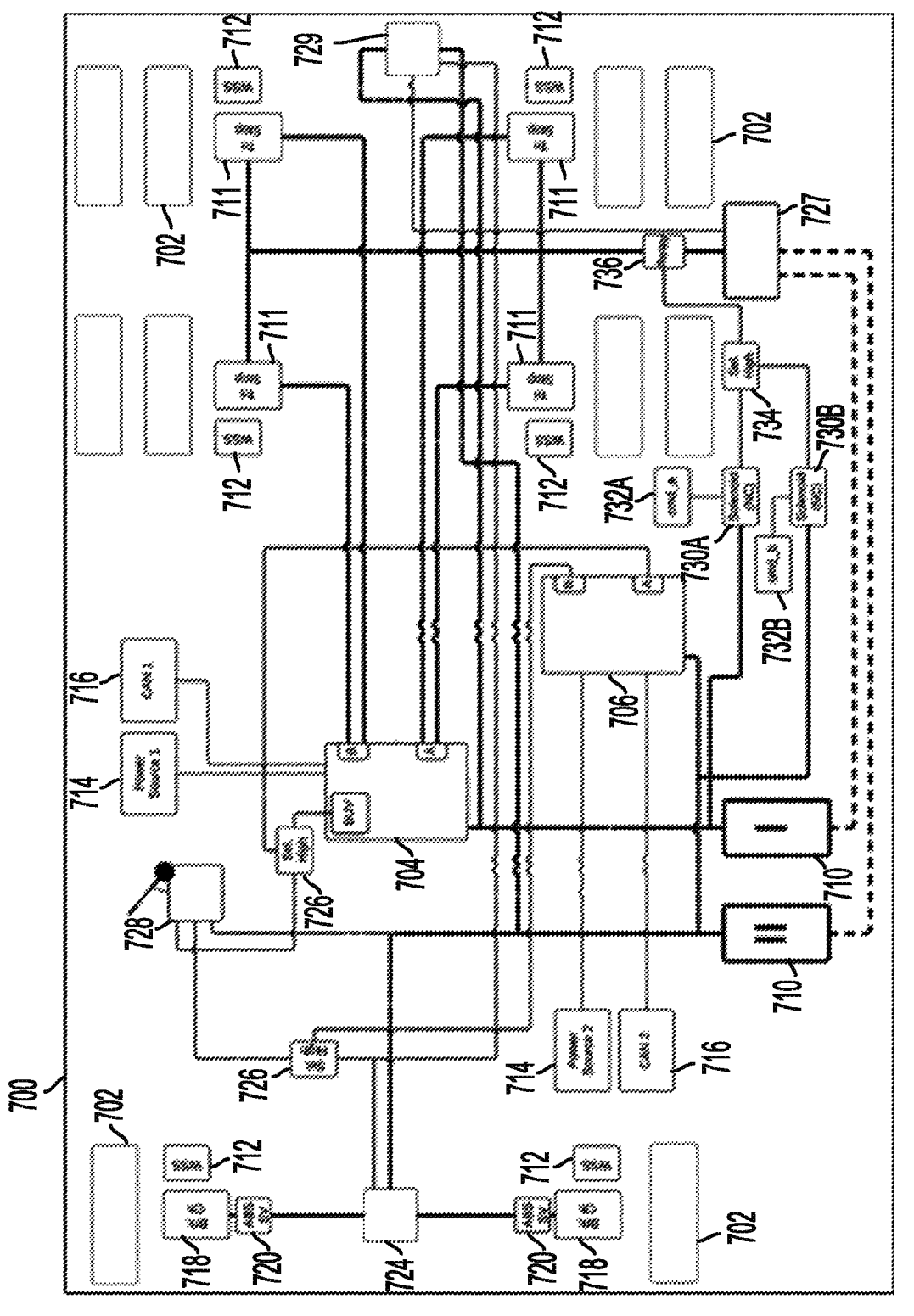
FIG. 7 is a block diagram showing a brake system for activating vehicle brakes in response to a multi-point failure, according to one or more example embodiments.

FIG. 7 illustrates brake system 700, which can be implemented onboard a class 8 vehicle or other types of vehicles within example embodiments. In the example embodiment, brake system 700 is shown as a redundant brake system showing components arranged in a particular arrangement that enables application of vehicle brakes in cases of multi-point failure. In other examples, brake system 700 may include more or fewer components in other potential arrangements. For instance, in other examples, brake system 700 can incorporate additional controllers and components similar to brake system 500 shown in FIG. 5.

Brake system 700 includes components arranged to create multiple brake circuits that can slow and stop rotation of wheels 702 of a vehicle, which may or may not be pulling a trailer. In other examples, the vehicle that uses brake system 700 can have a different quantity of wheels and axles. As further shown in FIG. 7, brake system 700 includes multiple brake controllers, which are shown as primary brake controller 704 and secondary brake controller 706. Brake system 700 may include additional controllers in some embodiments similar to brake system 500 shown in FIG. 5. With the different brake circuits enabled by including multiple brake controllers, brake system 700 provides multiple options for slowing and stopping the rotation of wheels 702, which increases safety in situations of brake malfunction or error. As an example, in some cases, primary brake controller 704 and secondary brake controller 706 perform operations to work together so that any single point failure within brake system 700 does not lead to a loss of braking for the vehicle.

In some example embodiments, both primary brake controller 704 and secondary brake controller 706 are connected to independent communication and power sources such that a failure in these, which may be outside the brake system boundary, also does not lead to a loss of braking for the vehicle. In the event of a primary system failure that disrupts operation of primary brake controller 704, secondary brake controller 706 has two outputs that can control the drive axles and the steer axle/trailer output respectively. These outputs of secondary brake controller 706 allow for pneumatic control of axle pressures. One or multiple of the brake controllers involve electronically actuatable pressure valves in some examples. In addition, brake controllers may communicate with one-another and manage the arbitration for braking applications.

As shown in FIG. 7, the brake controllers are connected to different components within brake system 700, which includes reservoirs 710, brakes 711, wheel-speed sensors 712, power sources 714, communication networks 716, brake chambers 718, anti-lock braking systems 720, modulate-able valve 724, valves 726, parking brake controller 727, FBM 728, trailer control module (TCM) 729. Primary brake controller 704 represents a main controller that can be used to apply brakes to slow down and stop rotation of wheels 702. Within brake system 700, primary brake controller 704 is shown connected to FBM 728. In some implementations, valves 726 can be implemented as multiple select high valves that produce the higher of the input pressures on the output. In addition, primary brake controller 704 includes outputs that are connected to the brakes 711 on rear axles. As further shown in brake system 700, primary brake controller 704 is also connected to power source 714, communication network 716, and reservoirs 710. As such, primary brake controller 504 serves as one controller capable of applying the brakes.

Secondary brake controller 706 serves as a redundant controller that can be used to apply brakes to slow down and stop rotation of wheels 702. Within brake system 700, secondary brake controller 706 has a first output that is connected to FBM 728. Secondary brake controller 706 also has a second output that is connected to FBM 728. Secondary brake controller 706 is also shown connected to reservoirs 710. As further shown, secondary brake controller 706 can receive power from power source 714 and communicate with communication network 716.

In some examples, primary brake controller 704 and secondary brake controller 706 may communicate with each other via a private bus between the two (not shown), which enables communication if one or both CANs 716 fail. In some cases, however, the private bus may not work as a gateway so a failure of CAN 716 may cause a fail-over to secondary brake controller 706. A vehicle computing system may send identical requests on both CANs 716 to enable brake system 700 to determine whether primary brake controller 704 or secondary brake controller 706 fulfills the command. In addition, primary brake controller 704 and secondary brake controller 706 may continuously report their health status to the vehicle computing system so that the vehicle computing system is aware if an issue occurs in either system and can take appropriate action.

Reservoirs 710 are pressure-rated tanks that can hold a supply of compressed air until required for braking or operating auxiliary air systems. As such, reservoirs 710 may be designed to store a sufficient volume of air to allow several brake applications if the engine stops or the compressor fails and the maximum air pressure available for brake applications depends on how much air is in reservoirs 710. The vehicle may not be able to make a higher pressure brake application than there is air pressure in reservoirs 710. Each reservoir is equipped with a drain valve, which can allow reservoirs 710 to be drained of moisture and other contaminants that build up in the system. In addition, reservoirs 710 can be connected to a compressed-air supply device, which can supply each reservoir 710 with compressed air. As shown in FIG. 7, reservoirs 710 can also be connected to parking brake controller 727, which enables distribution of compressed air to rear brakes 711 for parking applications. If a severe enough pneumatic leakage occurs, the parking brakes are configured to automatically apply in some embodiments. Wheel-speed sensors 712 represent sensors that can measure the rotation of wheels 702. Wheel-speed sensors 712 can measure the speed of associated wheels in order to detect whether a given wheel is locked or tending to lock.

Power sources 714 represent any type of onboard power supply source that can provide power to controllers and other components displayed as part of brake system 700. Brake chambers 718 can convert compressed air pressure energy into mechanical force and movement that apply the vehicle's brakes. Air pressure enters the pressure side of the brake chamber through the inlet port and forces against the diaphragm, which moves the pushrod assembly forward. When air pressure is released from brake chambers 718, the return spring returns the diaphragm and push rod to their released positions.

Anti-lock brake system 720 can be used to help the vehicle to steer by preventing the wheels from locking up. As shown, anti-lock brake systems 720 are coupled to modulate-able valve 724. Valves 726 can enable different brake controllers to control the pressure of individual axles of the vehicle. FBM 728 represents a brake module and is shown connected to the primary brake controller 704 and secondary brake controller 706. TCM 729 represents any type of trailer control module, which can be used to coordinate control of the trailer.

In some embodiments, a primary control circuit can be formed using primary brake controller 704 and reservoir 710, which can command the pressure to the drive axles via the pilot line that mechanically or pneumatically controls the valves within primary brake controller 704 that drive air volume to brakes 711 positioned at the rear axle. A secondary control circuit can be formed using reservoir 710, modulate-able valve 724, secondary brake controller 706, which can command pressure to the steer axle via pilot line which mechanically (pneumatically) controls the valve within modulate-able valve 724 that drives air volume to brake chambers 718 that can be positioned by a steer axle of the vehicle. Similarly, secondary brake controller 706 can command pressure to the TCM via pilot line which mechanically or pneumatically drives air volume to the trailer axle brake chambers (not shown).

As further shown in FIG. 7, braking system 700 includes solenoids 730A, 730B, pneumatic select high valve 734, and relay valve 736, which can be a pneumatic valve. In some embodiments, solenoids 730A, 730B are pneumatic valves, which are configured to be normally closed. As an example result, when solenoids 730A, 730B are not powered, the flow of air through solenoids 730A, 730B is blocked. As such, solenoids 730A, 730B can be opened to allow air to flow through each solenoid 730A, 730B via a simple electrical signal (e.g., power signal). Each solenoid 730A, 730B may be electrically connected to a unique and separate electrical signal source configured to provide controls, which allows solenoids 730A, 730B to operate separately. The electrical signal source(s) can be from primary brake controller 704 and secondary brake controller 706 and/or from one or multiple vehicle computing systems onboard the vehicle. In the example embodiment, control signal 732A and control signal 732B are included to represent sources of electrical signals and may correspond to sources located onboard the vehicle.

As shown, solenoids 730A, 730B can be connected to different reservoirs 710. By connecting to different reservoirs 710, a leak in one pneumatic circuit that causes a loss of supply pressure does not impact the performance of the other pneumatic circuit. In particular, one of solenoids 730A, 730B would still be connected to a reservoir 710 without a leak if one of the circuits is experiencing a leak, which enables the vehicle to continue to function normally (i.e., not trigger the dead man's switch unnecessarily).

In addition, select high valve 734 is shown included as part of brake system 700 and is a pneumatic select high valve in the example embodiment. As a mechanical component, select high valve 734 includes 2 inputs, which are connected to the outputs of solenoids 730A, 730B, respectively. Select high valve 734 also includes an output, which connects to relay valve 736 as shown in FIG. 7. In some embodiments, select high valve 734 is designed to output the higher pressure side of the two inputs received at select high valve 734 from pneumatic solenoids 730A, 730B. In other embodiments, select high valve 734 can have another design that enables disclosed operations to be performed.

Relay valve 736 is a mechanical component, which can have two inputs and one output in some examples. For instance, in the example embodiment, one input of relay valve 736 is connected to a pilot line, which serves as a pneumatic command signal. The pilot line is used to determine the output pressure of relay valve 736. The other input of relay valve 736 is connected to a supply line, which can provide air to pressurize the output of relay valve 736. The output of relay valve 736 produces air volume until the output matches the pressure of the pilot line. In some examples, relay valve 736 operates similar to a select-low valve. In particular, whichever of the two inputs has a lower pressure dictates the pressure output by relay valve 736.

In some examples, solenoids 730A, 730B can be connected to the primary and secondary sides of a vehicle computing system. This enables the vehicle computing system to have control of the dead man's switch in some cases. If an individual side fails, solenoid 730A or solenoid 730B closes depending on the side. In some cases, both solenoid 730A and solenoid 730B may fail. For example, if the vehicle computing system has a dual failure that impacts both primary and secondary sides, both solenoids 730A, 730B are depowered where the power supplied to each is modified (e.g., shut off).

In some examples, solenoids 730A, 730B are connected to a brake subsystem associated with primary brake controller 704 and another brake subsystem with secondary brake controller 706. If an individual brake controller fails (either primary brake controller 704 or secondary brake controller 706), the failure results in the power reduction (e.g., powering down) of the connected solenoid 730A, 730B while the other solenoid 730A, 730B remains powered. If brake system 700 experiences a dual failure that impacts both primary brake controller 704 and secondary brake controller 706, both solenoids 730A, 730B are then depowered, which results in the engagement of vehicle brakes to slow and stop the vehicle. This arrangement can operate in cases where communication with vehicle systems are impacted. The brake system can still stop the vehicle even if the communication with vehicle systems fails.

During normal operation of braking system 700, the system powers both solenoids 730A, 730B. By powering both solenoids 730A, 730B, the air pressure from the source reservoirs 710 is pushed through solenoids 730A, 730B and into the inputs of select high valve 734. For example, both reservoirs 710 can be around 120 pounds per square inch (PSI), which causes both solenoids 730A, 730B to output 120 PSI to the inputs of select high valve 734. Select high valve 734 can be implemented to produce the higher of the two input pressures on the output (e.g., approximately 120 PSI). The pilot line input to relay valve 736 can be 120 PSI, which allows parking brake controller 727 to control the operation of the parking brake. If parking brake controller 727 releases the parking brake, parking brake controller 727 can produce 120 PSI on the other input of relay valve 736, which then outputs the pressure to parking brake chambers thereby releasing the parking brake.

If the parking brake system wants to apply the parking brake, the system deflates (depressurizes) the pressure input to relay valve 736. Relay valve 736 can operate as a select low valve, which causes low pressure to be forwarded to the parking brake chambers, dumping the pressure from the parking brake chambers and applying the parking brake. When the vehicle is shut down, the system can power off both relay valves, which can depressurize the select high valve and depressurize the relay valve, effectively forcing the parking brake to be applied.

In some cases, a single sided failure can occur due to multiple reasons, such as the loss of reservoir pressure on a respective side or a loss of primary or secondary subsystems ability to control the vehicle. As such, the impact of either of these events results in the same behavior, the pressure output of the given solenoid 730A or solenoid 730B connected to the failed side will stop. Select high valve 734 then receives the pressure input from the functional side and outputs the higher pressure to relay valve 736.

As an example, if the source to which the electrical signal is connected experiences a failure, the failure results in the depower (e.g., power cut off) of the connected solenoid valve (e.g., solenoid 730A or solenoid 730B). The depowering causes the output of the connected solenoid valve connected to select high valve 734 to depressurize. The opposite solenoid valve (connected to the still functional side) is still able to continue feeding select high valve 734 with pressure, which is output to relay valve 736. When a pneumatic circuit experiences a leak and the reservoir pressure drops, the opposite side (connected to the non-leaking circuit) still provides nominal pressure to select high valve 734. As such, leak protection is created by the two circuit designs of the base vehicle pneumatic system, which is used to implement the dead man's switch.

In the event that a dual failure occurs that impacts both primary and secondary controllers, the electrical source to both solenoids 730A, 730B is depowered. When both solenoids 730A, 730B are depowered, each solenoid 730A, 730B discards pressure via their respective outputs, which causes both inputs of select high valve 734 to be reduced to zero pressure. As an example result, select high valve 734 disposes the pressure on its output, which causes the pilot line that inputs relay valve 736 to also have zero pressure. When the pilot line input to relay valve 736 is 0, relay valve 736 then also dumps the pressure from the output, which causes the pressure from the parking brake chambers to be discarded resulting in the application of the parking brake. With the parking brakes applied, the vehicle then slows down to a stop.

As such, the dead man's switch activates in response to a full loss of power to the vehicle systems. This full loss of power would cause a dual sided failure of both the service brake system as well as the vehicle computing system. For example, from a lightning strike. In some examples, the parking brake remains in its current state in the event of a power loss, so the parking brake system alone cannot be relied upon in this scenario. On Class 8 vehicles, if the reservoir pressure drops below a 'pop-out' pressure, the parking brakes will automatically apply, bringing the vehicle to a stop. This is different from the system described above, as this relies on low reservoir pressure to actuate the parking brake, instead of a loss of electrical power or a loss of ECU functionality.

In some examples, disclosed techniques may be performed by a vehicle that can operate as autonomous or semi-autonomous vehicles. For example, a semi-truck can include the various sensors, computing systems, and software that enables the semi-truck to autonomously navigate entire routes or portions of routes. When the semi-truck is programmed to navigate a portion of a route, the vehicle systems may enable a driver to take over and control the semi-truck to navigate the remaining portions of the route.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:

providing, by a computing system coupled to a vehicle, a first signal to a first electronic control unit (ECU), wherein the first ECU is communicably coupled to a pressure-controlled electronic braking assembly;

determining a speed of the vehicle remains unchanged for a threshold duration after providing the first signal to the first ECU; and based on determining the speed of the vehicle remains unchanged for the threshold duration, providing, by the computing system, a second signal to at least a second ECU from a set of additional ECUs, wherein the set of additional ECUs includes at least the second ECU and a third ECU communicably coupled in parallel to the pressure-controlled electronic braking assembly, and wherein the second ECU activates, based on the second signal, one or more vehicle brake sets of the vehicle via the pressure-controlled electronic braking assembly.

2. The method of claim 1, wherein providing the second signal to at least the second ECU comprises:

providing the second signal to the second ECU; and providing a third signal to the third ECU, wherein the third ECU activates one or more vehicle brake sets of the vehicle based on the third signal.

3. The method of claim 2, wherein providing the third signal to the third ECU comprises:

providing the third signal to the third ECU in parallel with providing the second signal to the second ECU.

4. The method of claim 2, wherein providing the third signal to the third ECU comprises:

determining a speed of the vehicle remains unchanged for a threshold duration after providing the second signal to the second ECU; and based on determining the speed of the vehicle remains unchanged for the threshold duration, providing the third signal to the third ECU.

5. The method of claim 1, further comprising:

receiving sensor data from a sensor coupled to the vehicle, wherein the sensor data represents an environment of the vehicle; and providing, based on the sensor data, the first signal to the first ECU.

6. The method of claim 1, further comprising:

receiving a response from the first ECU, wherein the response indicates the first ECU is unable to operate the pressure-controlled electronic braking assembly; and based on receiving the response from the first ECU, providing the second signal to the second ECU.

7. The method of claim 1, further comprising:

based on providing the second signal to at least the second ECU from the set of additional ECUs, providing an alert at a control interface of the vehicle, wherein the alert comprises at least an audio alert or visual alert indicating a malfunction associated with the first ECU.

8. The method of claim 1, further comprising:

determining a speed of the vehicle remains unchanged for a threshold duration after providing the second signal to at least the second ECU; and based on determining the speed of the vehicle remains unchanged for the threshold duration, depowering a pair of solenoid valves, wherein depowering the pair of solenoid valves triggers an application of at least one brake set of the vehicle.

9. The method of claim 8, wherein depowering the pair of solenoid valves triggers an application of a parking brake of the vehicle.

10. A system comprising:

a vehicle having a vehicle brake system, wherein the vehicle brake system comprises:

a pressure-controlled electronic braking assembly coupled to one or more vehicle brake sets, and a plurality of electronic control units (ECUs) communicably coupled to the pressure-controlled electronic braking assembly; and a computing system coupled to the vehicle, wherein the computing system is configured to:

provide a first signal to a first ECU;

determine a speed of the vehicle remains unchanged for a threshold duration after providing the first signal to the first ECU; and based on determining the speed of the vehicle remains unchanged for the threshold duration, provide a second signal to at least a second ECU from the plurality of ECUs, wherein the plurality of ECUs includes at least the second ECU and a third ECU communicably coupled in parallel to the pressure-controlled electronic braking assembly, and wherein the second ECU activates, based on the second signal, one or more vehicle brake sets of the vehicle via the pressure-controlled electronic braking assembly.

11. The system of claim 10, wherein the first ECU is coupled to a first power source, and wherein the second ECU and the third ECU are coupled to a second power source.

12. The system of claim 10, wherein the first ECU is coupled to a first power source, wherein the second ECU is coupled to a second power source, and wherein the third ECU is coupled to a third power source.

13. The system of claim 10, wherein the computing system is configured to:

provide the second signal to the second ECU and a third signal to the third ECU, wherein the third ECU activates one or more vehicle brake sets of the vehicle based on the third signal.

14. The system of claim 10, wherein the vehicle is a class 8 truck.

15. The system of claim 10, wherein the computing system is further configured to:

determine a speed of the vehicle remains unchanged for a threshold duration after providing the second signal to the second ECU; and based on determining the speed of the vehicle remains unchanged for the threshold duration, provide a third signal to the third ECU.

16. The system of claim 10, wherein the computing system is further configured to:

determine a speed of the vehicle remains unchanged for a threshold duration after providing the second signal to the second ECU;

based on determining the speed of the vehicle remains unchanged for the threshold duration, receive a failure indication from the second ECU; and based on the failure indication, provide a third signal to the third ECU and provide an alert at a control interface of the vehicle indicating a malfunction associated with the second ECU.

17. The system of claim 10, wherein the computing system is further configured to:

receive sensor data from a sensor coupled to the vehicle, wherein the sensor data represents an environment of the vehicle; and provide, based on the sensor data, the first signal to the first ECU.

18. The system of claim 10, wherein the vehicle brake system further comprises a pair of solenoid valves, and wherein the computing system is further configured to:

determine a speed of the vehicle remains unchanged for a threshold duration after providing the second signal to at least the second ECU; and based on determining the speed of the vehicle remains unchanged for the threshold duration, depower the pair of solenoid valves, wherein depowering the pair of solenoid valves triggers an application of a parking brake of the vehicle.

19. A method comprising:

providing, from a pressurized fluid source, a pressurized fluid stream to a pressure-controlled electronic braking assembly of an autonomous vehicle, wherein the pressure-controlled electronic braking assembly is fluidly coupled to a vehicle brake set of the autonomous vehicle;

providing sensor data from a vehicle sensor of the autonomous vehicle to a set of electronic control units (ECUs) communicably coupled to the pressure-controlled electronic braking assembly, wherein the set of ECUs includes a primary electronic control unit and a pair of additional ECUs, and wherein the pair of additional ECUs are communicably coupled in parallel to the pressure-controlled electronic braking assembly;

based on the sensor data, controlling, by at least one ECU, the pressure-controlled electronic braking assembly to adjust a pressure of the pressurized fluid stream provided to the vehicle brake set of the autonomous vehicle;

determining a speed of the vehicle remains unchanged for a threshold duration after controlling the pressure-controlled electronic braking assembly based on the sensor data; and based on determining the speed of the vehicle remains unchanged for the threshold duration, providing a second signal to at least one of the pair of additional ECUs to activate the vehicle brake set.

* * * * *